(12) United States Patent
Fassbender

(10) Patent No.: US 8,524,084 B2
(45) Date of Patent: *Sep. 3, 2013

(54) WASTEWATER TREATMENT

(71) Applicant: Alexander Fassbender, Vienna, VA (US)

(72) Inventor: Alexander Fassbender, Vienna, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/721,238

(22) Filed: Dec. 20, 2012

(65) Prior Publication Data

US 2013/0105410 A1   May 2, 2013

Related U.S. Application Data

(63) Continuation of application No. 13/490,258, filed on Jun. 6, 2012, now Pat. No. 8,361,319, which is a continuation of application No. 13/166,568, filed on Jun. 22, 2011, now Pat. No. 8,197,689.

(60) Provisional application No. 61/398,797, filed on Jul. 1, 2010.

(51) Int. Cl.
*C02F 3/30* (2006.01)
*F28D 13/00* (2006.01)

(52) U.S. Cl.
USPC ........... 210/605; 210/612; 210/617; 210/630; 210/150; 210/151; 210/175; 210/259; 165/120

(58) Field of Classification Search
USPC .......... 210/605, 621, 613, 616, 617, 623, 210/630, 903, 150, 151, 175, 252, 259, 612; 165/120, 920
See application file for complete search history.

(56) References Cited

U.S. PATENT DOCUMENTS 3,372,742 A * 3/1968 Forner ........................ 165/96
4,925,571 A   5/1990 Jacob et al.
(Continued)

FOREIGN PATENT DOCUMENTS

DE   4041820 A1   6/1992
JP   62-144798 A * 6/1987
(Continued)

OTHER PUBLICATIONS

Wastewater Engineering Treatment and Reuse, Fourth Edition, G. Tchobanoglous, Franklin L. Burton, H. David Stensel, Metcalf & Eddy, Inc. Tata McGraw Hill Publishing Ltd. 2003, pp. 678-680, 682, 702-716, 717-720, 750-765, 791-798, 962-969.

(Continued)

*Primary Examiner* — Fred Prince
(74) *Attorney, Agent, or Firm* — Fish & Richardson P.C.

(57) ABSTRACT

A wastewater treatment system includes wastewater having nitrogen-containing compounds, an anoxic zone having denitrifying bacteria, and an aerobic zone having nitrifying bacteria. The anoxic zone is coupled to the aerobic zone, and wastewater flows from the anoxic to the aerobic zone or vice versa. A fluidized bed heat exchanger configured to accept heat from a heat engine and to transfer the heat from the heat engine to the wastewater is positioned in the aerobic zone or the anoxic zone. The fluidized bed heat exchanger includes particulate media, and fluidization of the particulate media scrubs bacterial growth from portions of the fluidized bed heat exchanger. Treating wastewater can include flowing wastewater having nitrogen-containing compounds into a biological reactor having an anoxic zone and an aerobic zone, and heating the wastewater with heat from a heat engine to facilitate denitrification reactions in the anoxic zone and nitrification reactions in the aerobic zone.

20 Claims, 10 Drawing Sheets

(56) References Cited

U.S. PATENT DOCUMENTS

| | | | |
|---|---|---|---|
| 5,167,930 | A | 12/1992 | Fassbender |
| 5,221,486 | A | 6/1993 | Fassbender |
| 5,533,868 | A | 7/1996 | Fassbender |
| 5,733,454 | A | 3/1998 | Cummings |
| 5,773,281 | A * | 6/1998 | Ichikawa et al. ........... 435/290.2 |
| 5,961,830 | A | 10/1999 | Barnett |
| 6,133,004 | A | 10/2000 | Sato et al. |
| 6,196,000 | B1 | 3/2001 | Fassbender |
| 6,299,774 | B1 | 10/2001 | Ainsworth et al. |
| 6,391,203 | B1 | 5/2002 | Fassbender |
| 6,454,944 | B1 | 9/2002 | Raven |
| 6,558,643 | B2 | 5/2003 | Blonigen et al. |
| 6,716,351 | B2 | 4/2004 | Fassbender |
| 6,893,566 | B2 | 5/2005 | Fassbender |
| 6,918,253 | B2 | 7/2005 | Fassbender |
| 7,144,509 | B2 | 12/2006 | Boyd et al. |
| 2001/0033816 | A1 | 10/2001 | Blonigen et al. |
| 2001/0037976 | A1 | 11/2001 | Blonigen et al. |
| 2003/0037550 | A1 | 2/2003 | Fassbender |
| 2003/0094410 | A1 | 5/2003 | Fassbender |
| 2003/0143718 | A1 | 7/2003 | Sumino et al. |
| 2004/0164019 | A1 | 8/2004 | Fassbender |
| 2007/0012619 | A1 | 1/2007 | Thielert |
| 2007/0163952 | A1 | 7/2007 | Schreier et al. |
| 2008/0053909 | A1 | 3/2008 | Fassbender |
| 2008/0053913 | A1 | 3/2008 | Fassbender |
| 2008/0156726 | A1 | 7/2008 | Fassbender |
| 2010/0018216 | A1 | 1/2010 | Fassbender |
| 2012/0000849 | A1 | 1/2012 | Fassbender |

FOREIGN PATENT DOCUMENTS

| | | |
|---|---|---|
| KR | 862400 B1 | 10/2008 |
| KR | 920177 B1 | 10/2009 |
| WO | WO2012003128 A3 | 3/2012 |

OTHER PUBLICATIONS

Design of Wastewater Treatment Plants, WEF Manual of Practice No. 8, ASCE Manual and Report on Engineering Practice No. 76, vol. I, 1992, p. 532.

Design of Wastewater Treatment Plants, WEF Manual of Practice No. 8, ASCE Manual and Report on Engineering Practice No. 76, vol. II, 1992, pp. 912-938 and 965-988.

Maureen O'Shaughnessy et al., Influence of Plant Parameters on Effluent Organic Nitrogen, Water Environment Foundation, 2006, pp. 3417-3423.

George T. Moore, Nutrient Control Design Manual, State of Technology Review Report, Jan. 2009, EPA, United States Environmental Protection Agency, The Cadmus Group, Inc., Watertown, MA, 104 pages.

Michael Richard, Ph.D., et al., Aerated Lagoon Technology, Enhanced Cold Temperature Nitrifications in Municipal Aerated Lagoon Using Ringlace Fixed Film Media, Sep. 11, 1995, retrieved on internet Nov. 9, 2011 at http://www.lagoonsonline.com/richard.htm, 9 pages.

Hazen and Sawyer Environmental Engineers & Scientist, Jamaica Bay BioWin Modeling Implications for Nitrogen Limit Negotiations, Oct. 31, 2008, DEP, City of New York Department of Environmental Protection, 58 pages.

R.C. Darton, Hydrodynamics, Heat, and Mass Transfer in Three-Phase Fluidized Beds, 1986, Amsterdam (Shell Research, B.V.) pp. 573-587.

Luis Carrio et al., Ammonia-Nitrogen Removal from Centrate—10 years of Testing and Operating Experience in New York City, Oct. 14, 2003, 52 pages.

Chesapeake Bay TMDL Presentation to the Water Resources Technical Committed, May 13, 2010, 30 pages.

Nancy G. Love, Maximizing the Dual Benefits of Advanced Wastewater Treatment Plant Processes: Reducing Nutrients and Emerging Contaminants, WERF Conference Washington, DC, May 12-13, 2008, 18 pages.

Andrew Wellner, Palmer Eyes Waster Heat to Boost Sewer Treatment, Jan. 4, 2011, Frontiersman, retrieved on internet at http://www.frontiersman.com/news/palmer-eyes-waste-heat-to-boost-sewer-treatment/article, 2 pages.

Korean Examiner Kim Dae Young, International Search Report and Written Opinion, International Application No. PCT/US2011/041506 dated Feb. 10, 2012, 12 pages.

Machine-generated, partial English translation of KR 10-0920177, generated on Mar. 2, 2012.

* cited by examiner

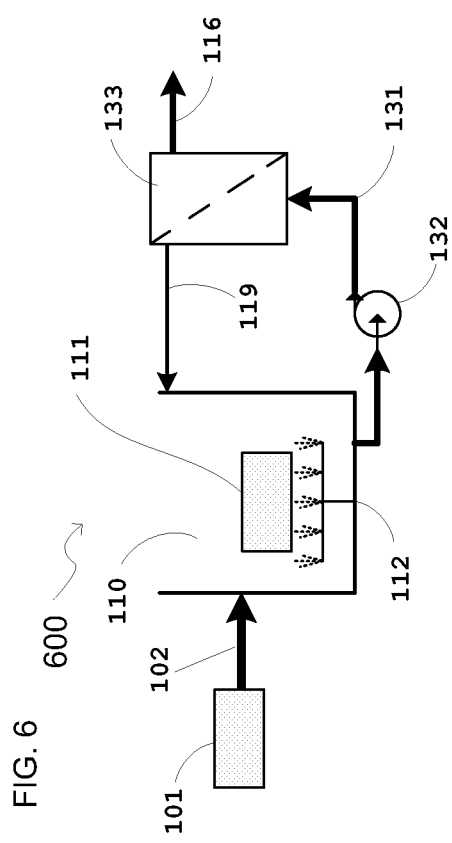
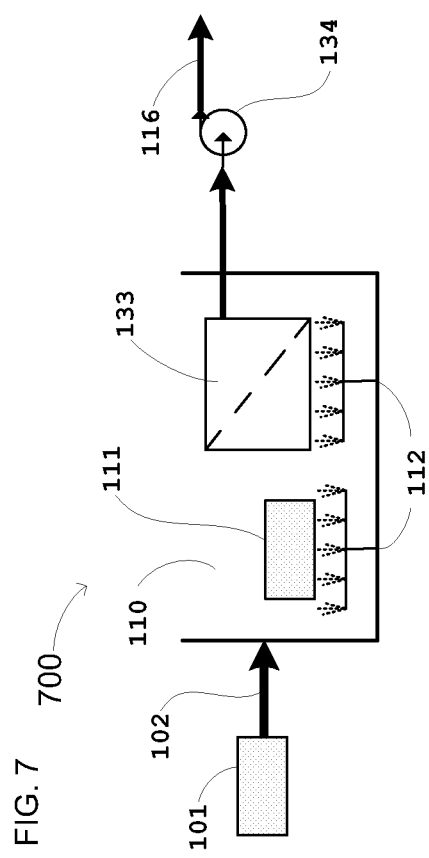

WASTEWATER TREATMENT

CROSS-REFERENCE TO RELATED APPLICATIONS

This application is a continuation of and claims priority to U.S. application Ser. No. 13/490,258, entitled "Wastewater Treatment" filed Jun. 6, 2012, now U.S. Pat. No. 8,361,319, which is a continuation of and claims priority to U.S. application Ser. No. 13/166,568 entitled "Wastewater Treatment" filed Jun. 22, 2011, now U.S. Pat. No. 8,197,689, which claims priority to U.S. application Ser. No. 61/398,797 filed Jul. 1, 2010 entitled "Method and Apparatus for High Rate Waste Water Treatment," all of which are incorporated by reference herein in their entirety.

FIELD OF THE INVENTION

This invention is related to wastewater treatment.

BACKGROUND

Wastewater treatment facilities are found around the world and many are located in areas where the temperature of the water treated varies with the seasons. Many of these facilities are facing regulatory pressures to reduce the amount of fixed nitrogen discharged. To meet stringent discharge requirements, wastewater facilities are typically designed to perform during cold weather conditions. The biological organisms used by these facilities to treat nitrogen compounds are affected by temperature: nitrification and denitrification organisms are more effective at temperatures between 25° C. and 30° C. and less effective at temperatures between 8° C. and 12° C.

SUMMARY

Implementations of the present disclosure are directed to devices, systems, and techniques for treatment of wastewater, including nutrient removal through nitrification/denitrification. As described herein, heat from a heat engine (e.g., waste heat from a power generation system) is provided to adjust a temperature of wastewater in a wastewater treatment system to improve the kinetics of biological reactors including nitrifying and denitrifying bacteria. Advantages of the devices, systems, and techniques described herein can include a reduction in the physical size of wastewater treatment zones needed for a given flow and contaminant load and more effective destruction of endocrine disrupting contaminants in the wastewater. In addition, controlling the temperature of wastewater in a wastewater treatment system may allow operators to control the performance of the wastewater treatment system at varying water flow and waste loads and under different climate conditions.

In a general aspect, a wastewater treatment system includes wastewater having nitrogen-containing compounds, an anoxic zone having denitrifying bacteria, and an aerobic zone having nitrifying bacteria. The anoxic zone is coupled to the aerobic zone, and wastewater flows from the anoxic zone to the aerobic zone or vice versa. The wastewater treatment system is configured to accept heat from a heat engine to heat the wastewater.

In some cases, a fluidized bed heat exchanger is positioned in the aerobic zone and configured to accept heat from a heat engine and to transfer the heat from the heat engine to the wastewater. The fluidized bed heat exchanger may include particulate media, and air provided to the aerobic zone fluidizes the particulate media, thereby scrubbing bacterial growth from portions of the fluidized bed heat exchanger.

In certain cases, a fluidized bed heat exchanger is positioned in the anoxic zone and configured to accept heat from a heat engine and to transfer the heat from the heat engine to the wastewater. The fluidized bed heat exchanger may include particulate media, and fluid in the anoxic zone fluidizes the particulate media, thereby scrubbing bacterial growth from portions of the fluidized bed heat exchanger In another general aspect, treating wastewater includes flowing wastewater having nitrogen-containing compounds into a biological reactor having an anoxic zone and an aerobic zone, and heating the wastewater with heat from a heat engine to facilitate denitrification reactions in the anoxic zone and to facilitate nitrification reactions in the aerobic zone. Heating the wastewater with the heat from the heat engine may include transferring the heat from the heat engine to a fluidized bed heat exchanger positioned in the anoxic zone and flowing the wastewater through the fluidized bed heat exchanger. The fluidized bed heat exchanger may include particulate media, and fluid in the anoxic zone may fluidize the particulate media, thereby scrubbing bacterial growth from portions of the fluidized bed heat exchanger.

In another general aspect, a three phase fluidized bed heat exchanger for heating wastewater containing bacteria and nitrogen-containing compounds includes heat exchange tubes, porous particulates in contact with the heat exchange tubes, and bacteria coupled to an interior of the porous particulates.

These and other implementations may each optionally include one or more of the following features.

The wastewater treatment system can accept heat from a heat engine to heat the wastewater. Accepting heat from a heat engine can include heating the wastewater in the anoxic zone, heating the wastewater in aerobic zone, or both. The wastewater treatment system may include a power generation system, the power generation system including the heat engine. The heat engine can be selected from the group consisting of a gas turbine, a steam turbine, a fuel cell, and an internal combustion engine.

In some cases, the wastewater treatment system is configured to transfer the heat from the heat engine to the wastewater by contacting a heated fluid with the wastewater. In certain cases, the wastewater treatment system includes a heat exchanger configured to accept the heat from the heat engine and transfer the heat from the heat engine to the wastewater. The heat exchanger may be selected from the group consisting of a liquid to liquid heat exchanger, a gas to liquid heat exchanger, a condensing heat exchanger, and a fluidized bed heat exchanger. The fluidized bed heat exchanger may be a two phase fluidized bed heat exchanger or a three phase fluidized bed heat exchanger. The particulate media may include solid particles or porous particles. Bacteria may be coupled to the exposed surface of the solid particles. In some cases, bacteria are coupled to an interior surface of the porous particles.

The three phase fluidized bed heat exchanger can be positioned in an aerobic zone of a wastewater treatment system. Air provided to the aerobic reaction zone fluidizes the porous particulates, thereby scrubbing bacterial growth from portions of the heat exchanger (e.g., the heat exchange tubes) and leaving bacterial growth inside pores in the porous particulates. The three phase fluidized bed heat exchanger may include a means for providing a flow pattern for the porous particulates to contact the heat exchange tubes. In some cases, the three phase fluidized bed heat exchanger includes one or more elongated members (e.g., perforated tubes or porous cylinders) arranged among the porous particulates and configured to allow introduction of air among the porous particles. In some implementations, the wastewater treatment system includes a mixer configured to mix the fluid in the anoxic zone, thereby promoting fluidization of the particulate media in the fluidized bed heat exchanger. In certain implementations, the wastewater treatment system includes a pump configured to pressurize the fluid in the anoxic zone, thereby promoting fluidization of the particulate media in the fluidized bed heat exchanger.

A temperature of the wastewater in the anoxic zone, the aerobic zone, or both may be in a range of 20° C. to 35° C. or a range of 24° C. to 30° C. A mixed liquor suspended solids content of wastewater in the anoxic zone, the aerobic zone, or both may be between 1,000 and 20,000 parts per million. This wastewater with a mixed liquor suspended solids content between 1,000 and 20,000 parts per million has not been thickened.

Heating the wastewater can include heating the wastewater in the anoxic zone, heating the wastewater in the aerobic zone, or both. Heating the wastewater with heat from the heat engine can include transferring heat to the wastewater directly or indirectly. Transferring the heat to the wastewater directly may include heating a fluid with the heat from the heat engine, and contacting the heated fluid with the wastewater. Transferring heat to the wastewater indirectly may include transferring heat from the heat engine to a heat exchanger, and flowing the wastewater through the heat exchanger. In some cases, transferring heat to the wastewater indirectly includes transferring heat from the heat engine to a three phase fluidized bed heat exchanger positioned in the aerobic reaction zone and providing air to the aerobic reaction zone. Heating the wastewater with heat from the heat engine indirectly can include heating water with heat from the heat engine to form steam, and transferring heat from the steam to the wastewater via a heat exchanger. In certain cases, heating the wastewater with heat from the heat engine includes transferring heat from a power generation system to the wastewater, wherein the power generation system comprises the heat engine.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 depicts a wastewater treatment system using an external membrane biological reactor configuration with optional locations for heat exchangers.

FIG. 7 depicts a wastewater treatment system using an internal membrane biological reactor configuration with optional locations for heat exchangers.

DETAILED DESCRIPTION

Figure 1:
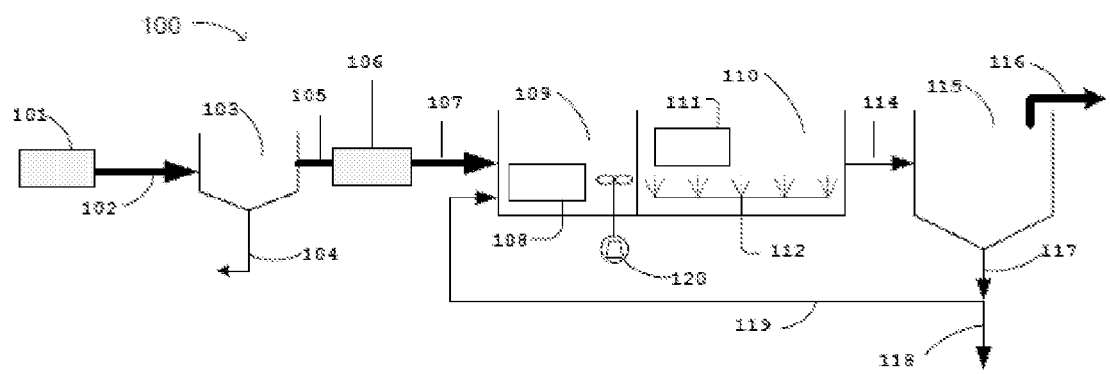
FIG. 1 depicts a wastewater treatment system using the Ludzak-Ettinger Process with optional locations for heat exchangers.

Heat engines that consume fuel to produce shaft horsepower reject a portion of the energy in the fuel as waste heat at temperatures that can be used to enhance the performance of a biological nitrification or denitrification system. As described herein, waste heat from a heat engine can be used to elevate the operational temperature of wastewater in anoxic and aerobic zones of biological reactors in wastewater treatment systems, and thus speed up the biological nitrification and denitrification processes, reducing residence times and treatment volumes. Under aerobic conditions in a reaction zone where the dissolved oxygen is generally equal to or greater than 2 ppm, the biological organisms can oxidize nitrogen compounds to nitrite and nitrate compounds. Under anoxic conditions in a reaction zone, biological organisms can reduce nitrite and nitrate compounds into nitrogen gas. These biological reactors typically have a mixed liquor suspended solids (MLSS) concentration between 1,000 and 5,000 ppm in the case of a non-membrane system, or between 8,000 and 20,000 ppm in the case of an aerated membrane bioreactor in their reaction zones. Thus, the biological reactors can have a MLSS concentration between 1,000 and 20,000 ppm. In contrast, sludge digesters are anaerobic (i.e., not aerated) and typically have a solids concentration of at least 10,000 ppm. In many cases, primary and waste activated sludge are combined and thickened to solids concentrations of 40,000 to 70,000 ppm prior to entering the anaerobic sludge digester. In some cases, an existing wastewater treatment system designed to operate at lower temperatures can be adapted to process higher loads of nitrogen-containing compounds by elevating the treatment temperature in the wastewater treatment system. Elevating the treatment temperature in a wastewater treatment system can also increase the uptake of oxygen from aeration systems. Increased oxygen uptake provides more oxygen for a given aeration input, thereby increasing performance. Increased oxygen uptake may also allow reduced aeration input for the same oxygen uptake, thereby reducing energy requirements.

As described herein, waste heat from a heat engine (e.g., at a power plant) can be provided to a biological reactor in a wastewater treatment system (e.g., a wastewater treatment plant). The kinetics of bacterial biological processes increase with increasing temperature generally in accordance with the equation 1:

$$k_T = k_{20} \theta^{(T-20)}, \quad (1)$$

in which $k_T$ is the reaction rate coefficient at temperature T (° C.), $k_{20}$ is the reaction rate coefficient at 20° C., $\theta$ is the temperature activity coefficient (unitless), and T is temperature (° C.). For nitrification, $\theta$ can range from about 1.03 to about 1.08. θ can be, for example, about 1.03, about 1.04, about 1.05, about 1.06, about 1.07, or about 1.08.

The waste heat from the heat engine can be used to heat wastewater treated in a biological reactor of a wastewater treatment system. In some cases, the waste heat from the heat engine is used to maintain a substantially constant elevated temperature in the biological reactor. As used herein, maintaining a "substantially constant" elevated temperature generally refers to maintaining a temperature within a range of 8° C., 5° C., or 2° C. over a length of time typically related to the hydraulic retention time or solids retention time and measured in hours to tens of hours. In the case of a wastewater treatment system, an elevated temperature enables designers to use a smaller facility, such as a secondary treatment (ST) system, biological nutrient removal (BNR) system, or an enhanced nutrient removal (ENR) system using the limit of technology (LOT) design, to accomplish the same level of treatment achieved with a larger facility at ambient temperatures. Typical municipal wastewater nutrient contents and effluent discharge parameters for various levels of technology (e.g., ST system or ENR system) are shown in Table 1. Table 1 also shows the criteria for nutrients needed to avoid impairment of receiving waters. In sensitive and impaired waterways such as the Chesapeake Bay, many wastewater treatment systems are subject to regulatory requirements relating to nitrogen emission levels that are commensurate with treatment to the ENR or LOT level. The capital cost of upgrading a wastewater treatment system from one level to the next increases with the stringency of the criteria.

phase fluidized bed heat exchangers, direct contact heat exchange, and the like, or any combination thereof. The thermal mass of the main flow entering the system is typically 150 to 200 times larger than the thermal mass of sludge produced. Coupling heat from a heat engine with a wastewater treatment system can facilitate aerobic, anoxic and anaerobic processes on wastewater. The electric power generated by the heat engine coupled to the wastewater treatment system can be in excess of the demands of the wastewater system. The excess electric power may be integrated into the local grid or sold.

In direct contact heat exchange, the heat can be provided by injection of steam or heated water directly into the influent wastewater. In some cases, waste heat from a heat engine is used to heat effluent from the wastewater system. A portion of the treated water can be heated (e.g., to a temperature in a range between about 70° C. and about 95° C.), and then mixed with the influent to bring the temperature of the combined stream to a suitable temperature for the biological reaction vessel or zone. A suitable temperature is, for example, in a range of 20 to 35° C. in a range of 24 and 30° C. Use of clean, disinfected effluent reduces the potential for bio-fouling of the heat exchanger. In some cases, when it is desired to reduce the mass of water recycled through the wastewater treatment system, the heated effluent can be sent to a vacuum zone where steam is vaporized from the water at a pressure that is near or below atmospheric pressure. Examples of vacuum devices used to generate steam include a venturi eductor and blower or compressor. In the case of an eductor, the wastewater can be the motive force to generate suction, and the

TABLE 1

| | Treatment Technologies and Effluent Discharge Nutrient Ranges | | | | | |
|---|---|---|---|---|---|---|
| Effluent Parameter | Typical Municipal Raw Wastewater mg/L | Secondary Treatment (ST) (No Nutrient Removal) mg/L | Typical Advanced Treatment Nutrient Removal (BNR) mg/L | Enhanced Nutrient Removal (ENR) mg/L | Limits of Treatment Technology (LOT) mg/L | Typical In-Stream Nutrient Criteria mg/L |
| Total Phosphorus | 4 to 8 | 4 to 6 | 1 | 0.25 to 0.50 | 0.05 to 0.07 | 0.020 to 0.050 |
| Total Nitrogen | 25 to 35 | 20 to 30 | 10 | 4 to 6 | 3 to 4 | 0.30 to 0.60 |

Heat (e.g., waste heat) from a heat engine can be directed to biological processes of a wastewater treatment system, to conventional heat rejection system, or to a combination thereof. Conventional heat rejection systems can include, for example, a cooling tower or a body of water such as a river, lake, or sea. Heat from the engine can be directed to biological processes of a wastewater treatment system and conventional heat rejection system in any ratio or proportion needed to achieve the desired temperature elevation of wastewater treated in the in the biological reactors of the wastewater treatment system. For example, heat in excess of the amount needed to heat influent wastewater and maintain the temperature in a biological reactor of a wastewater treatment system at a temperature in a range between 20 and 30° C. may be directed to conventional heat rejection system.

As described herein, heat (e.g., waste heat) from shaft horsepower generation can be coupled to a wastewater treatment system to elevate and stabilize the temperature in the main flow (e.g., influent) entering the wastewater treatment system. Waste heat from a heat engine is transferred to influent in a wastewater treatment system via indirect heat exchangers, two-phase fluidized bed heat exchangers, three-combined stream can be mixed with the recycled activated sludge. In this manner, a portion of energy used to pump liquid through the eductor can be used to also provide mixing energy to mix the heated influent with the contents of the biological reactor. As such, an eductor can be used to generate a vacuum, as a mixing device, or both.

The vacuum treated water decreases in temperature as steam is produced and the liquid water portion may be recycled back to the heat engine to be re-heated. The steam has higher energy content per unit mass and can be delivered to a heat exchanger at a pressure sufficient to allow it to contact the influent or to heat the influent indirectly. In an example of direct contact, the steam condenses onto the wastewater and transfers heat to the wastewater. In some cases, a heat engine (e.g., gas turbine, fuel cell, or internal combustion engine such as a diesel engine), is capable of efficient operation while rejecting heat at a temperature at or above the boiling point of water. In these cases, steam at a pressure at or above atmospheric pressure can be generated directly and contacted with the influent wastewater without an additional vaporization process.

In some examples, steam is used in an indirect heat exchange with the wastewater. When the heat engine is powered by a clean fuel, such as natural gas, the sensible heat from the combustion exhaust and the latent heat from the water generated in the combustion of the natural gas can be recovered and used. This recovery can be performed with indirect heat exchange or by direct heat exchange where a water spray removes the sensible heat and condenses a portion of the water produced in the combustion process. This condensed water may be substantially free of minerals, and may be used as boiler feed water that can be re-circulated without mineral buildup.

Depending on the design of the wastewater system, the temperature of the fluid sent from the heat engine cooling loop to the heat exchanger can be in a range of 50 to 130° C., or in a range of 70 to 110° C. In the case where the fluid is saturated steam, the pressure of the steam is related to the temperature. At temperatures above 100° C., the steam will be at or above atmospheric pressure. By use of deaerated steam or the addition of a small vacuum pump on the back of the heat exchanger, it is possible to generate steam in one location at a pressure below atmospheric pressure and have it flow by natural pressure gradient to a condenser where the steam is condensed at a lower temperature.

In some cases, non-condensable gases may be removed (e.g., by a small vacuum pump or venturi eductor) after the condenser. The energy needed to remove the non-condensable gases as well as the energy needed to remove the liquid from the condenser can be less than the energy to compress the steam. In this manner, an indirect heat exchange method where steam is generated at the heat engine location and condensed in a heat exchanger that heats the influent wastewater can be operated without a compressor. Since the latent heat of condensing steam has higher energy content than sensible heat of the same mass of circulating liquid, a smaller mass flow rate of steam can be used to deliver a given amount of heat to the heat exchanger.

In certain examples, heat from the heat engine combustion exhaust can be transferred to water by direct contact or by means of a heat exchanger. The use of direct contact heat exchange reduces or eliminates the potential for fouling of heat exchange surfaces and may require less capital cost than the use of indirect heat exchange.

Some wastewater treatment systems include fluidized particulate media loaded with bacteria. The biological film in the interstitial areas of the particulate media is protected from being abraded off during the scrubbing action of fluidized particulate media rubbing against each other. The scrubbing action by the continuous random motion of the particles removes the biological layer from the exposed surfaces of these particles but leaves the biological components on the internal surfaces. The surfaces of a heat exchanger may also be scrubbed by the motion of particles kept in a fluidized bed state. The particles may be cylindrical, spherical, ellipsoidal, rectangular, or tetragonal in shape, or any mixture thereof. The particles may be solid or may be porous, such that biological films can form on interior surfaces of the particles.

Typically, denitrification reactions using endogenous decay or influent wastewater as an electron donor are much slower than denitrification reactions where a costly soluble carbon source such as methanol, sugar or glycerol is used. In some cases, a fluidized bed heat exchanger operated in a two phase or three phase manner is used to transfer heat from a fluid in heat exchange contact with the heat engine and the wastewater. In certain cases, a vessel and blower are used such that a portion of the heat contained in the fluid in heat exchange contact with the heat engine is vaporized into steam, and that steam is used to transfer heat directly or indirectly to the wastewater.

Table 2 contains the results of an analysis of a 6 million gallon per day (MGD) complete mix activated sludge (CMAS) process with nitrification and denitrification at temperatures of 8° C. and 12° C., compared to operation of the same equipment at 30° C. The energy savings and volume/size benefits of operating the wastewater treatment system at a stable elevated temperature realize up to a 39% to 64% improvement.

TABLE 2

Nitrification and denitrification volume and power at various temperatures

| Parameter | Unit | Amount Saved at 30° C. vs. | | % Saved vs. | |
| --- | --- | --- | --- | --- | --- |
| | | 8° C. | 12° C. | 8° C. | 12° C. |
| Aeration zone Volume, ea | m$^3$ | 1,991 | 1,410 | 58% | 49% |
| Anoxic zone Volume, ea | m$^3$ | 499 | 187 | 64% | 40% |
| Total zone Volume, ea | m$^3$ | 2,490 | 1,597 | 59% | 48% |
| Zone Area | m | 508 | 326 | 59% | 48% |
| Air Flow - Average | sm$^3$/min | 30 | 23 | 39% | 33% |
| Mixing Power | kW | 15 | 6 | 64% | 40% |
| Aeration Power | kW | 28 | 22 | 39% | 33% |

Since wastewater treatment systems are typically designed to meet continuous emissions levels specified in a permit, the size of the system is based on a typical cold weather scenario. For a system seeking to meet nitrogen emission limits, this scenario is generally related to winter flow when the temperature of the influent water is 8° C. or 12° C. In addition to temperature concerns, designers often consider additional factors such in-leakage from storm and ground water. By using the waste heat from a power generation system to heat influent, an existing ST wastewater treatment system can be converted into BNR systems at a lower cost commensurate with the reductions in zone volume and aeration. In like manner, the performance of a BNR wastewater treatment plant may be able to achieve the performance level of an ENR plant by using waste heat from a power generation system. The impact of a temperature change to the typical design sizes of the nitrification and denitrification process vessel of the present process for the given conditions are shown in Table 3. In each case shown in Table 3 (ST-biological oxygen demand (ST BOD) only at 12° C., nitrification at 12° C., nitrification+denitrification at 8° C., 12° C. and 30° C.), the wastewater flow, BOD and TKN (total Kjeldahl nitrogen) are the same. The mixed liquor suspended solids (MLSS) is a measure of the amount of biomass in the treatment process; this parameter is also the same for each case. The treated wastewater effluent characteristics in this example include the BOD, total suspended solids (TSS), oxidized nitrogen (NO$_x$—N), ammonia nitrogen (NH$_4$—N). The values for the BOD, TSS, NO$_x$—N and NH$_4$—N are different between the ST-BOD only, nitrification, and nitrification+denitrification cases at least because the cases represent different levels of treatment as shown in Table 1. Within the nitrification+denitrification level of treatment case, the treated wastewater effluent characteristics are the same. The number of aeration zones is the same in all cases. The number of anoxic zones is also the same for the cases that have anoxic zones.

The impact of operation at elevated temperature is demonstrated at least by the smaller solids retention time (SRT), aeration and anoxic zone volumes, and detention times required by the 30° C. case in comparison with the other nitrification+denitrification cases. The reduction in aeration zone volume for the 30° C. case approaches the required aeration zone volume of the ST-BOD only case. While the 30° C. case uses more oxygen due to the faster respiration rate of the biomass, the amount of aeration air used is also less. This occurs at least because the higher temperature also improves the kinetics of oxygen transfer between the aeration air and the wastewater. This improved rate in the mass transfer of oxygen from air allows more oxygen to be transferred from a given amount of air. The amount of required aeration air is related to the energy required to power the blowers that provide the air. The calculations in this example show that less air and less energy is used to provide nitrification+denitrification at 30° C. and ST-BOD only treatment at 12° C. Also, the endogenous decay rate of the biomass in the 30° C. case is higher, leading to a lower yield and production of less excess biomass. As such, there is lower waste sludge production and a lower cost for sludge disposal.

The results shown in Table 3 indicate that providing a stable elevated temperature in the biological reactors at a wastewater treatment plant can enhance performance and improve capacity without enlarging the hydraulic capacity of the wastewater plant. While a temperature of 30° C. has been used as a basis here, a temperature between 20° C. and 35° C. or between 24° C. and 30° C. could also be used. In some plants under some conditions, a specific temperature may be selected to optimize performance and avoid the growth of filamentous organisms. Wastewater treatment plants typically deal with flows and load that change on a diurnal and seasonal basis. The heat load to the wastewater treatment plant to maintain a stable elevated temperature may vary and may not always correspond to the demand for power from the heat engine. The availability of the treated effluent to cool the heat engine independent of the wastewater treatment process enables the flexibility necessary to balance the requirements of both the wastewater treatment process and the heat engine.

TABLE 3

Impact of operating temperature on system design parameters

| Design Parameter | Unit | ST-BOD only 12° C. | Nitrification 12° C. | Nitrification + Denitrification 8° C. | Nitrification + Denitrification 12° C. | Nitrification + Denitrification 30° C. |
|---|---|---|---|---|---|---|
| Average wastewater flow | $m^3/d$ | 22,464 | 22,464 | 22,464 | 22,464 | 22,464 |
| Average BOD load | kg/d | 3,145 | 3,145 | 3,145 | 3,145 | 3,145 |
| Average TKN Load | kg/d | 786 | 786 | 786 | 786 | 786 |
| Aerobic SRT | Days | 5.0 | 12.5 | 15.3 | 12.7 | 6.8 |
| Aeration Zones | number | 3 | 3 | 3 | 3 | 3 |
| Aeration zone Volume, ea | $m^3$ | 1,340 | 2,822 | 3,443 | 2,862 | 1,452 |
| Hydraulic Retention Time (Tau) | hours | 4.3 | 9.0 | 11.0 | 9.0 | 4.7 |
| Tau-$NO_x$ | hours | NA | NA | 2.50 | 1.50 | 0.90 |
| MLSS (mixed liquor suspended solids) | $g/m^3$ | 3,000 | 3,000 | 3,000 | 3,000 | 3,000 |
| MLVSS (mixed liquor volatile suspended solids) | $g/m^3$ | 2,400 | 2,370 | 2,368 | 2,367 | 2,357 |
| F/M (Food/Mass or BOD/MLVSS) | g/g d | 0.33 | 0.16 | | | |
| F/M Anoxic Zone | g/g d | NA | NA | 0.97 | 1.59 | 2.62 |
| BOD Loading | kg BOD/$m^3$ d | 0.78 | 0.37 | 0.30 | 0.37 | 0.72 |
| Sludge Production | kg/d | 2,413 | 2,032 | 2,031 | 2,026 | 1,922 |
| Observed Yield (total suspended solids/biodegradable chemical oxygen demand) | kg TSS/kg bCOD | 0.77 | 0.65 | 0.65 | 0.65 | 0.61 |
| Observed Yield (volatile suspended solids/biological oxygen demand) | kg VSS/kg BOD | 0.61 | 0.52 | 0.52 | 0.52 | 0.49 |
| Oxygen Required | kg/hr | 120.5 | 255.1 | 195.6 | 195.8 | 201.0 |
| Air Flow - Average | $sm^3/min$ | 55.5 | 90.5 | 76.2 | 69.4 | 46.5 |
| Return Activated Sludge ratio | unitless | 0.6 | 0.6 | 0.6 | 0.6 | 0.6 |
| Internal Recycle Ratio | | | NA | 3.13 | 3.13 | 3.13 |
| Anoxic Volume | $m^3$ | | NA | 2,340 | 1,404 | 842 |
| Anoxic Zones | number | | NA | 3 | 3 | 3 |
| Anoxic Zone Volume, ea | $m^3$ | | NA | 780 | 468 | 281 |
| Overall SDNR (specific denitrification rate) | g $NO_3$-n/g MLSS d | | NA | 0.17 | 0.25 | 0.44 |
| Detention Time | Hr | | NA | 2.50 | 1.50 | 0.90 |
| Mixing Power | kW | | NA | 23.40 | 14.04 | 8.42 |
| Aeration Power | kW | 52 | 85 | 72 | 65 | 44 |
| Alkalinity Required as $CaCO_3$ | kg/d | | 3,203 | 1,408 | 1,408 | 1,408 |
| Alkalinity Required as $Na_2CO_3$ | kg/d | | 5,380 | 2,365 | 2,365 | 2,365 |
| Effluent BOD | $g/m^3$ | 30 | 8.95 | 8.95 | 8.95 | 8.95 |
| Effluent TSS | $g/m^3$ | 30 | 10.0 | 10.0 | 10.0 | 10.0 |
| Effluent $NO_x$—N | $g/m^3$ | | 28 | 6.0 | 6.0 | 6.0 |
| Effluent $NH_4$—N | $g/m^3$ | 28.8 | 0.5 | 0.5 | 0.5 | 0.5 |

FIG. 1 depicts wastewater treatment system 100 using the Ludzak-Ettinger Process with optional locations for heat exchangers. Wastewater enters the system and may be optionally passed through heat exchanger 101 to form heated stream 102. Readily settled solids are removed in clarifier 103 to produce clarified stream 105. Primary sludge stream 104 includes solids from clarifier 103. The clarified wastewater in stream 105 may be optionally passed through heat exchanger 106 to produce stream 107. Stream 107 enters the anoxic zone 109 where denitrification reactions can occur. The fluid in anoxic zone 109 may be mixed with optional mixer 120. The fluid in anoxic zone 109 may also be heated by heat exchanger 108. Mixer 120 and heat exchanger 108 may be combined to provide improved flow of wastewater to heat exchanger 108. From anoxic zone 109 the wastewater flows into aerobic zone 110 where it is contacted with air provided by stream 112 and nitrogen compounds may be oxidized by nitrifying bacteria. The wastewater in aerobic zone 110 may be heated by heat exchanger 111. Heat exchanger 111 may be combined with aeration provided by stream 112 to enhance heat transfer. The wastewater treated in aerobic zone 110 flows via stream 114 into secondary clarifier 115 where the solids settle to the bottom to form settled sludge stream 117. Treated water stream 116 passes to disinfection (not shown) and is discharged from the wastewater treatment facility. Stream 117 is split into stream 118 and stream 119. Return activated sludge stream 119 is recycled back into anoxic zone 109. Waste activated sludge stream 118 typically joins primary sludge stream 104 in an anaerobic digester (not shown).

Heat can be provided to the wastewater treatment system via any combination of heat exchangers 101, 106, 108 and 111. In an example, heat exchangers 108 and 111 are suited to indirect heat exchange, due at least in part to the action of mixer 120 or the agitation provided by aeration stream 112. Additional pumps and agitators may be added to heat exchangers 101 and 106 to facilitate indirect heat exchange. Any of the heat exchanger locations are suited for direct heat exchange. An additional benefit of heating the wastewater in heat exchanger 101 is that the heated wastewater has a reduced viscosity and may enhance the performance of clarifier 103.

Figure 2:
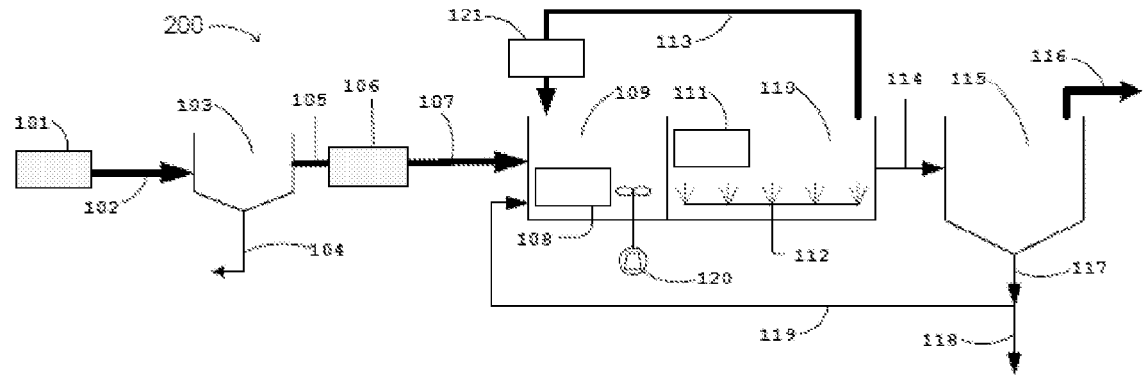
FIG. 2 depicts a wastewater treatment system using the Modified Ludzak-Ettinger Process with optional locations for heat exchangers.

FIG. 2 depicts wastewater treatment system 200 using the Modified Ludzak-Ettinger Process with optional locations for heat exchangers. Wastewater enters the system and may be optionally passed through heat exchanger 101 to form heated stream 102. Readily settled solids are removed in clarifier 103 to produce clarified stream 105. Primary sludge stream 104 includes solids from clarifier 103. The clarified wastewater in stream 105 may be optionally passed through heat exchanger 106 to produce stream 107. Stream 107 enters anoxic zone 109 where denitrification reactions can occur. The fluid in anoxic zone 109 may be mixed with optional mixer 120. The fluid in anoxic zone 109 may also be heated by heat exchanger 108. Mixer 120 and heat exchanger 120 may be combined to provide improved flow of wastewater to heat exchanger 108. From anoxic zone 109 the wastewater flows into aerobic zone 110 where it is contacted with air provided by stream 112 and nitrogen compounds may be oxidized by nitrifying bacteria. The wastewater in aerobic zone 110 may be heated by heat exchanger 111. Heat exchanger 111 may be combined with aeration provided by stream 112 to enhance heat transfer. A portion (e.g., a majority) of the wastewater treated in aerobic zone 110 flows via stream 113 back into anoxic zone 109. The recycle stream 113 returns oxidized nitrogen compounds to the anoxic zone 109 where denitrification reactions can convert oxidized nitrogen compounds into nitrogen gas. The size of recycle stream 113 is typically larger than stream 107, and this stream may be heated via heat exchanger 121. The remaining portion of the wastewater treated in aerobic zone 110 flows into secondary clarifier 115 where the solids settle to the bottom to form settled sludge stream 117. Treated water stream 116 passes to disinfection (not shown) and is discharged from the wastewater treatment facility. Stream 117 is split into stream 118 and stream 119. Return activated sludge stream 119 is recycled back into anoxic zone 109. Waste activated sludge stream 118 typically joins primary sludge stream 104 in an anaerobic digester (not shown).

Heat can be provided to the wastewater treatment system via any combination of heat exchangers 101, 106, 108, 111 and 121. In an example, heat exchangers 108 and 111 are suited to indirect heat exchange due at least in part to the action of mixer 120 or the agitation provided by the aeration stream 112. Additional pumps and agitators may be added to heat exchangers 101, 106 and 121 to facilitate indirect heat exchange. Any of the heat exchanger locations are suited for direct heat exchange. An additional benefit of heating the wastewater in heat exchanger 101 is that the heated wastewater has a reduced viscosity and may enhance the performance of clarifier 103.

Figure 3:
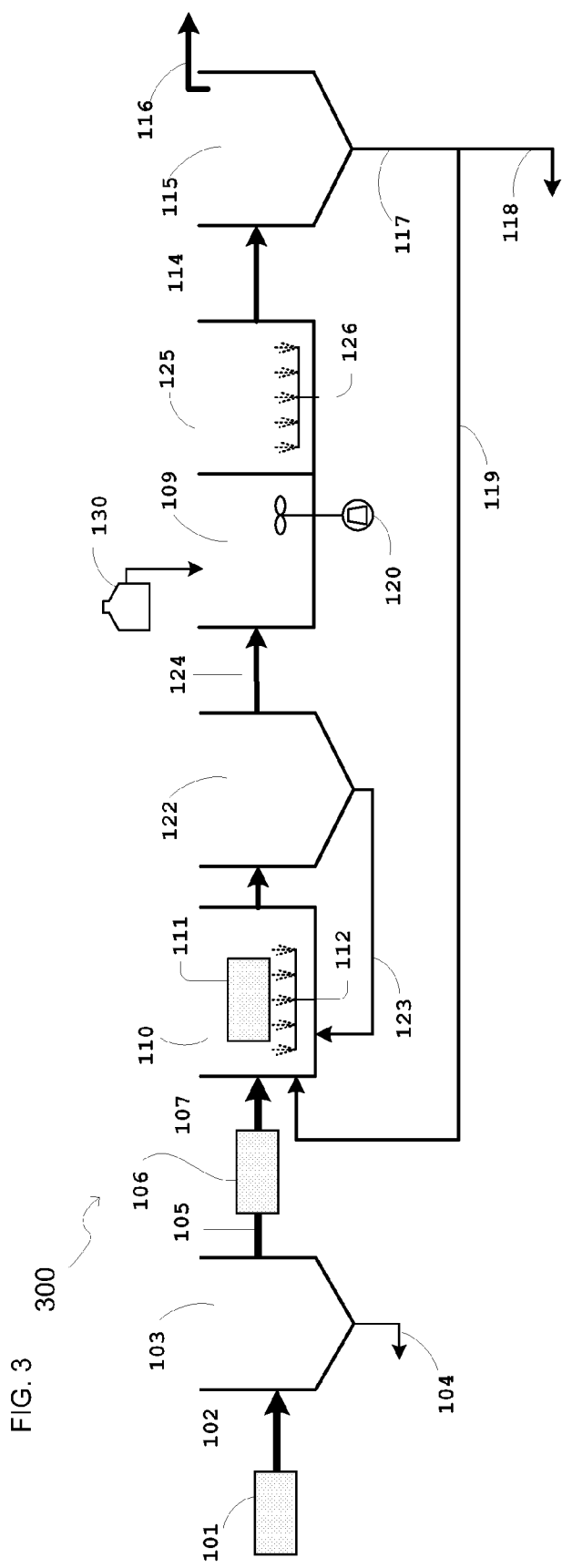
FIG. 3 depicts a wastewater treatment system using post-anoxic suspended growth process, two-sludge configuration with optional locations for heat exchangers.

FIG. 3 depicts wastewater treatment 300 system using a post-anoxic suspended growth process, two-sludge configuration with optional locations for heat exchangers shown. Wastewater enters the system and may be optionally passed through heat exchanger 101 to form heated stream 102. Readily settled solids are removed in clarifier 103 to produce clarified stream 105. The solids from clarifier 103 comprise the primary sludge stream 104. The clarified wastewater in stream 105 may be optionally passed through heat exchanger 106 to produce stream 107. Stream 107 flows into aerobic zone 110 where it is contacted with air provided by stream 112, enabling nitrogen compounds to be oxidized by nitrifying bacteria. The wastewater in aerobic zone 110 may be heated by heat exchanger 111. Heat exchanger 111 may be combined with aeration provided by stream 112 to enhance heat transfer. The treated water from aerobic zone 110 flows into nitrification clarifier 122 where solids settle and are separated from the main water flow. The settled solids from nitrification clarifier 122 are returned to aerobic zone 110 via stream 123. The clarified water from 122 then passes via stream 124 into anoxic zone 109. External carbon source 130 may provide carbon to denitrifying bacteria in second anoxic zone 109 to serve as an electron donor for denitrification reactions. The treated water from second anoxic zone 109 then passes into aerobic zone 125 where the reaction zone may be aerated by aerator 126. The wastewater treated in aerobic zone 125 flows via stream 114 into secondary clarifier 115 where the solids settle to be bottom to form settled sludge stream 117. Treated water stream 116 passes to disinfection (not shown) and is discharged from the wastewater treatment facility. Stream 117 is split into stream 118 and stream 119. Return activated sludge stream 119 is recycled back into aerobic zone 110. Waste activated sludge stream 118 typically joins primary sludge stream 104 in an anaerobic digester (not shown). Heat can be provided to the wastewater treatment system via any combination of heat exchangers 101, 106 and 111. In an example, heat exchanger 111 is suited to indirect heat exchange due at least in part to the action of the agitation provided by the aeration stream 112. Additional pumps and agitators may be added to heat exchangers 101 and 106 to facilitate indirect heat exchange. Any of the heat exchanger locations are suited for direct heat exchange. An additional benefit of heating the wastewater in heat exchanger 101 is that the heated wastewater has a reduced viscosity and may enhance the performance of clarifier 103.

Figure 4:
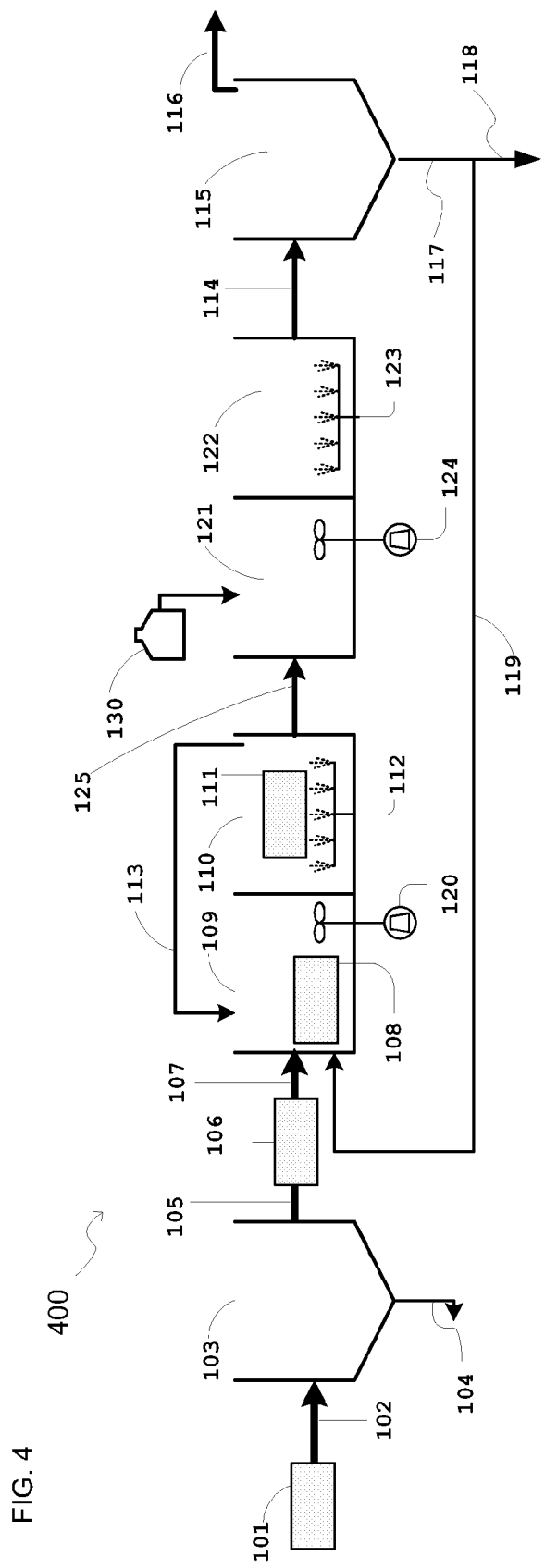
FIG. 4 depicts a wastewater treatment system using post-anoxic suspended growth process, four-stage BARDENPHO Configuration with optional locations for heat exchangers.

FIG. 4 depicts wastewater treatment system 400 using a post-anoxic suspended growth process, four-stage BARDENPHO configuration with the optional locations for heat exchangers shown. Wastewater enters the system and may be optionally passed through heat exchanger 101 to form heated stream 102. Readily settled solids are removed in clarifier 103 to produce clarified stream 105. Primary sludge stream 104 includes solids from clarifier 103. The clarified wastewater in stream 105 may be optionally passed through heat exchanger 106 to produce stream 107. Stream 107 enters anoxic zone 109 where denitrification reactions can occur.

The fluid in anoxic zone 109 may be mixed with optional mixer 120. The fluid in anoxic zone 109 may also be heated by heat exchanger 108. Mixer 120 and heat exchanger 120 may be combined to provide improved flow of wastewater to heat exchanger 108. From the anoxic zone 109 the wastewater flows into aerobic zone 110, where it is contacted with air provided by stream 112 and nitrogen compounds may be oxidized by nitrifying bacteria. The wastewater in the aerobic zone 110 may be heated by heat exchanger 111. Heat exchanger 111 may be combined with aeration provided by stream 112 to enhance heat transfer. A portion of the wastewater treated in the first aerobic zone 110 flows via stream 113 back into anoxic zone 109. Recycle stream 113 returns oxidized nitrogen compounds to anoxic zone 109 where denitrification reactions can convert oxidized nitrogen compounds into nitrogen gas. The remaining portion of the wastewater treated in aerobic zone 110 flows into anoxic zone 121 via stream 125. External carbon source 130 may provide carbon to denitrifying bacteria in anoxic zone 121 to serve as an electron donor for denitrification reactions. Mixers 124 may be used to enhance the mixing of anoxic zone 121. The treated water from anoxic zone 121 then passes into aerobic zone 122 where air may be provided by stream 123. The wastewater treated in aerobic zone 122 flows via stream 114 into secondary clarifier 115 where the solids settle to be bottom to form settled sludge stream 117. Treated water stream 116 passes to disinfection (not shown) and is discharged from the wastewater treatment facility. Stream 117 is split into stream 118 and stream 119. Return activated sludge stream 119 is recycled back into the aerobic zone 110. Waste activated sludge stream 118 typically joins primary sludge stream 104 in an anaerobic digester (not shown).

Heat can be provided to the wastewater treatment system via any combination of heat exchangers 101, 106, 108 and 111. In an example, heat exchangers 108 and 111 are suited to indirect heat exchange due at least in part to the action of the mixer 120 or the agitation provided by aeration stream 112. Additional pumps and agitators may be added to heat exchangers 101 and 106 to facilitate indirect heat exchange. Any of the heat exchanger locations are suited for direct heat exchange. An additional benefit of heating the wastewater in heat exchanger 101 is that the heated wastewater has a reduced viscosity and may enhance the performance of clarifier 103.

Figure 5:
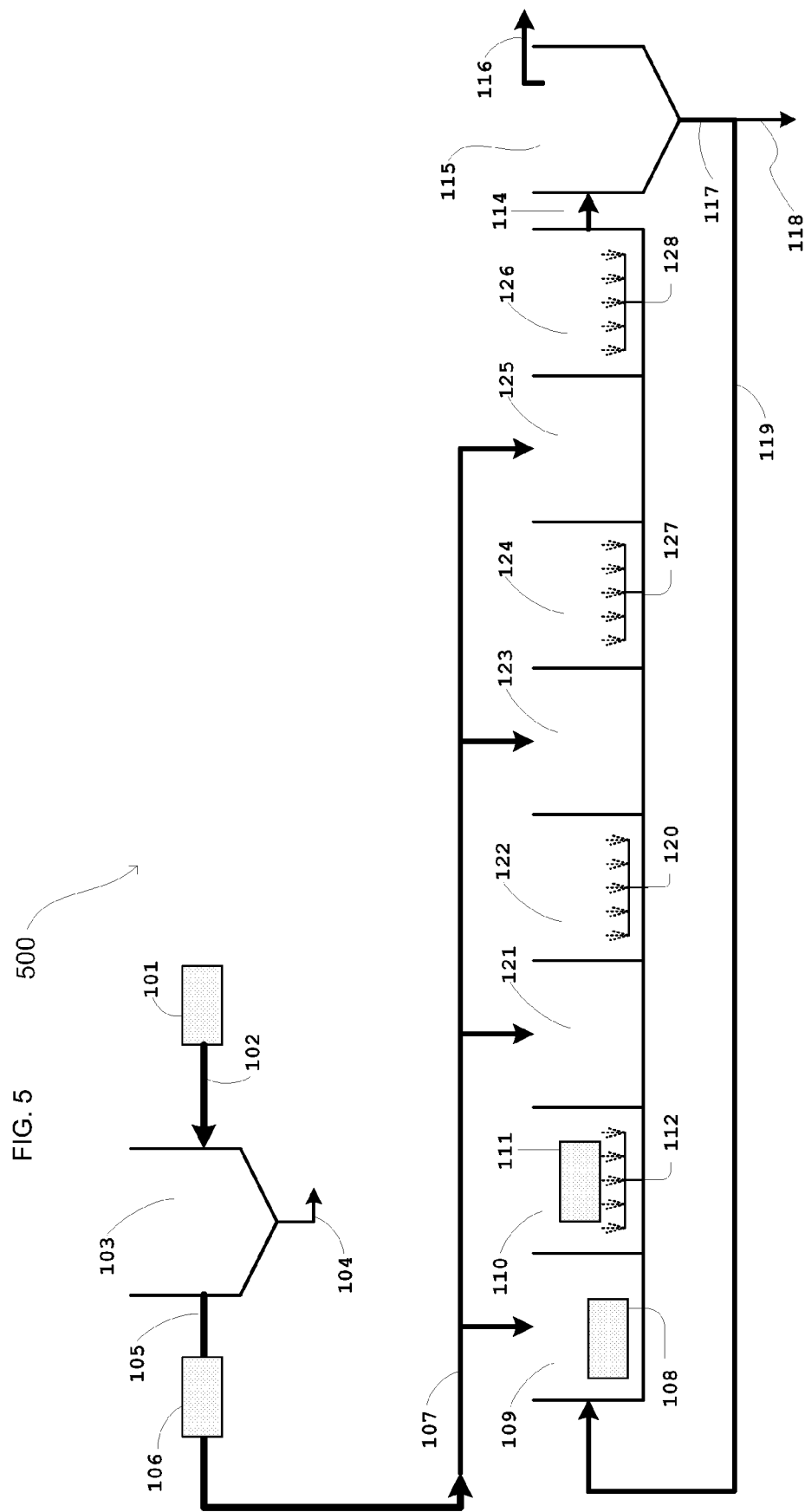
FIG. 5 depicts a wastewater treatment system using pre-anoxic suspended growth process, step-feed configuration with optional locations for heat exchangers.

FIG. 5 depicts wastewater treatment system 500 using a pre-anoxic suspended growth process, step-feed configuration with the optional locations for heat exchangers. Wastewater enters the system and may be optionally passed through heat exchanger 101 to form heated stream 102. Readily settled solids are removed in clarifier 103 to produce clarified stream 105. The solids from clarifier 103 comprise primary sludge stream 104. The clarified wastewater in stream 105 may be optionally passed through heat exchanger 106 to produce stream 107. Stream 107 is split into four portions. The first portion of stream 107 enters anoxic zone 109 where denitrification reactions can occur. The fluid in anoxic zone 109 may be mixed with optional mixer 120. The fluid in anoxic zone 109 may also be heated by heat exchanger 108. Mixer 120 and heat exchanger 120 may be combined to provide improved flow of wastewater to heat exchanger 108. From anoxic zone 109 the wastewater flows into aerobic zone 110 where it is contacted with air provided by stream 112 and nitrogen compounds may be oxidized by nitrifying bacteria. The wastewater in aerobic zone 110 may be heated by heat exchanger 111. Heat exchanger 111 may be combined with aeration provided by stream 112 to enhance heat transfer. The wastewater treated in aerobic zone 110 flows into anoxic zone 121 where it combines with the second portion of stream 107. Oxidized nitrogen compounds in anoxic zone 121 can utilize carbon from stream 107 as an electron donor for denitrification reactions that can convert oxidized nitrogen compounds into nitrogen gas. The treated water from anoxic zone 121 then passes into the aerobic zone 122 where it is combined with air from stream 120. The wastewater treated in aerobic zone 122 flows into anoxic zone 123 where it combines with the third portion of stream 107. Oxidized nitrogen compounds in the anoxic zone 123 can utilize carbon from stream 107 as an electron donor for denitrification reactions that can convert oxidized nitrogen compounds into nitrogen gas. The treated water from anoxic zone 123 then passes into aerobic zone 124 where it is combined with air from stream 127. The wastewater treated in aerobic zone 124 flows into anoxic zone 125 where it combines with the fourth portion of stream 107. Oxidized nitrogen compounds in anoxic zone 125 can utilize carbon from stream 107 as an electron donor for denitrification reactions that can convert oxidized nitrogen compounds into nitrogen gas. The treated water from the anoxic zone 125 then passes into aerobic zone 126 where it is combined with air from stream 128. The wastewater treated in aerobic zone 126 flows via stream 114 into secondary clarifier 115 where the solids settle to be bottom to form settled sludge stream 117. Treated water stream 116 passes to disinfection (not shown) and is discharged from the wastewater treatment facility. Stream 117 is split into stream 118 and stream 119. Return activated sludge stream 119 is recycled back into aerobic zone 110. Waste activated sludge stream 118 typically joins primary sludge stream 104 in a thickener and an anaerobic digester (not shown).

Heat can be provided to the wastewater treatment system via any combination of heat exchangers 101, 106, 108 and 111. In an example, heat exchangers 108 and 111 are suited to indirect heat exchange due at least in part to the action of the mixer 120 or the agitation provided by the aeration stream 112. Additional pumps and agitators may be added to heat exchangers 101 and 106 to facilitate indirect heat exchange. Any of the heat exchanger locations are suited for direct heat exchange. An additional benefit of heating the wastewater in heat exchanger 101 is that the heated wastewater has a reduced viscosity and may enhance the performance of clarifier 103.

FIG. 6 depicts wastewater treatment system 600 using an external membrane biological reactor configuration with optional locations for heat exchangers shown. Wastewater enters the system and may be optionally passed through heat exchanger 101 to form heated stream 102. Stream 102 flows into aerobic zone 110 where it is contacted with air provided by stream 112, enabling nitrogen compounds to be oxidized by nitrifying bacteria. The wastewater in aerobic zone 110 may be heated by heat exchanger 111. Heat exchanger 111 may be combined with aeration provided by stream 112 to enhance heat transfer. The treated water from aerobic zone 110 is pumped via pump 132 and stream 131 into membrane 133. Treated water passes through the membrane to become stream 116. The remaining water and biosolids flow back into aerobic zone 110 via stream 119. The high biomass content of membrane biological reactors enables denitrification reactions to occur in locally anoxic zones inside an aerated vessel. A further benefit of the present process in combination with a membrane biological reactor is that the increased water temperature reduces water viscosity and leads to a lower pressure drop across the membrane for a given flow.

FIG. 7 depicts wastewater treatment system 700 using an internal membrane biological reactor configuration with the optional locations for heat exchangers. Wastewater enters the system and may be optionally passed through heat exchanger 101 to form heated stream 102. Stream 102 flows into aerobic zone 110 where it is contacted with air provided by stream 112, enabling nitrogen compounds to be oxidized by nitrifying bacteria. The wastewater in aerobic zone 110 may be heated by heat exchanger 111. Heat exchanger 111 may be combined with aeration provided by stream 112 to enhance heat transfer. The treated water in aerobic zone 110 passes through membrane 133 and flows into pump 134 to become treated water stream 116. The high biomass content of membrane biological reactors enables denitrification reactions to occur in locally anoxic zones inside an aerated vessel. A further benefit of the present process in combination with a membrane biological reactor is that the increased water temperature reduces water viscosity and leads to a lower pressure drop across the membrane for a given flow.

Figure 8:
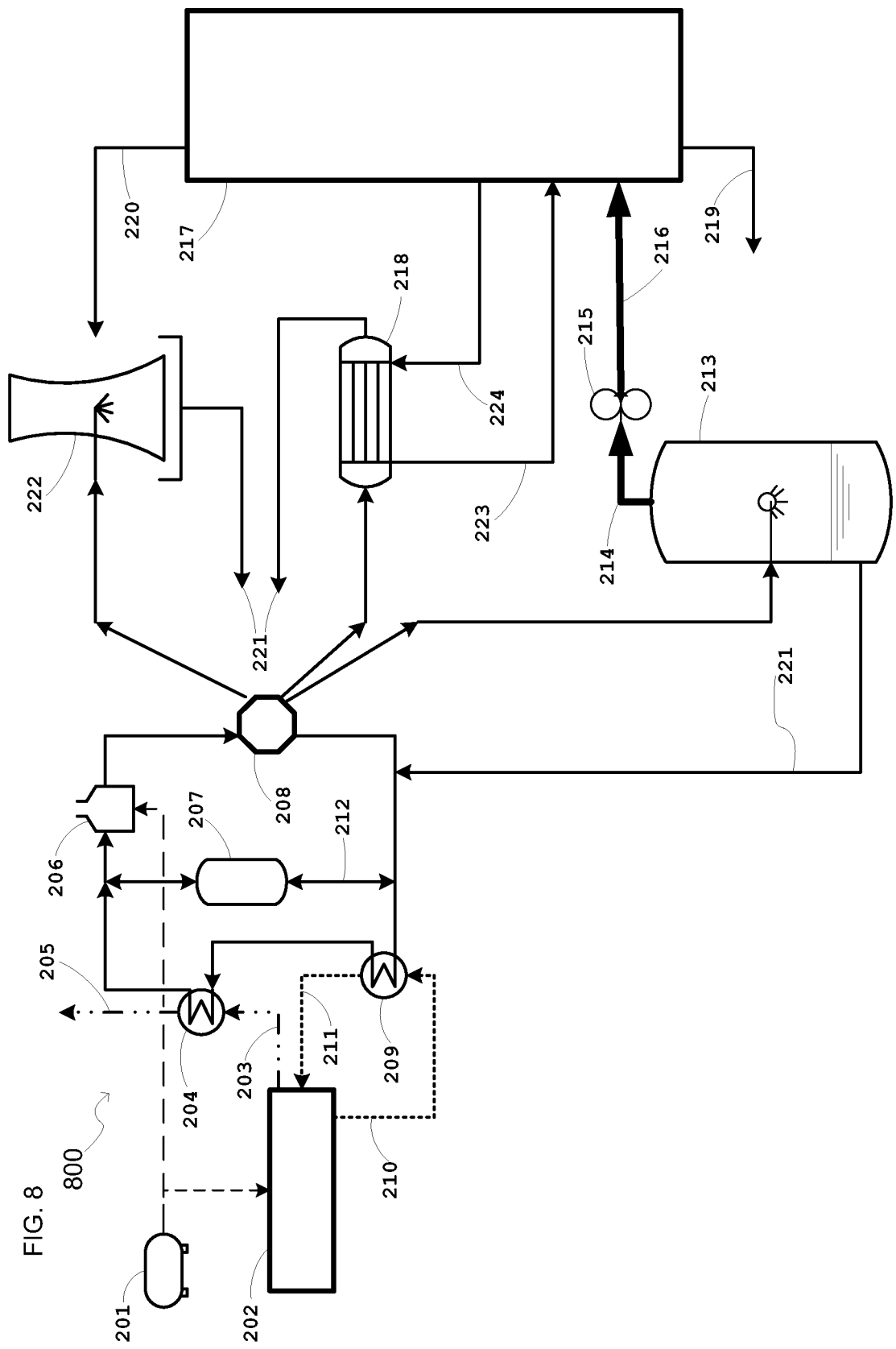
FIG. 8 depicts a heat engine system and transfer of waste heat from the heat engine to heat exchangers in a wastewater treatment system.

FIG. 8 depicts heat engine system 800 and the ways that the waste heat from the heat engine can be transferred to the heat exchangers in wastewater treatment system 217. Fuel from a fuel tank or fuel supply 201 is delivered to a heat engine 202 such as a gas turbine, steam turbine or internal combustion engine. Waste heat from combustion exhaust stream 203 is captured in heat exchanger 204 and transferred to a heat transfer fluid circulation loop wherein the heated fluid is depicted as stream 212. The spent combustion exhaust is discharged in stream 205. Stream 210 is another waste heat stream generated by heat engine 202. When heat engine 202 is an internal combustion engine, stream 210 represents the cooling water used in the engine jacket and oil cooler. When heat engine 202 is steam turbine, stream 210 represent the cooling water used in the steam condenser. In both the internal combustion and steam turbine cases, corresponding stream 211 is the return stream of cooling fluid after the heat had been transferred to heat transfer loop cool fluid stream 221 in heat exchanger 209. Buffer vessel 207 is used to manage the temperature of heat transfer fluid loop hot fluid stream 212. Peak boiler 206 is used to provide heat to heat transfer fluid loop hot fluid stream 212 in the event additional heat is required. Flow controllers 208 direct the flow of heated fluid in heat transfer loop hot fluid stream 212 to the end use and receive and direct the flow of the heat transfer loop cool fluid stream 221.

When steam is generated, hot water is directed to vessel 213, where a portion of the hot water stream flashes into steam stream 214. At lower steam temperature where the steam is intended for direct contact heat exchange, compressor or blower 215 may be used to raise the pressure of the steam or a water powered eductor may be used to enable the lower pressure steam to contact the water. At higher steam temperatures and indirect heat exchange configurations, there may be sufficient pressure in the steam stream to enable the steam to move to the heat exchanger or direct contact application without a compressor or blower. Indirect heat exchange applications using steam generate condensate stream 219 that can be returned to heat transfer fluid loop 212.

FIG. 8 also shows heat exchanger, 218 and cooling tower 222 for removing heat from heat transfer fluid loop 212 and returning heat transfer loop cool fluid stream 221. When heat transfer fluid loop 212 uses water for evaporative coolers or make up water 220, the make up water can be obtained by processing the treated water from the wastewater treatment system. Stream 224 is the wastewater from the wastewater treatment plant that is heated in heat exchanger 218. Stream 223 is the heated return stream to the wastewater treatment plant.

Figure 9:
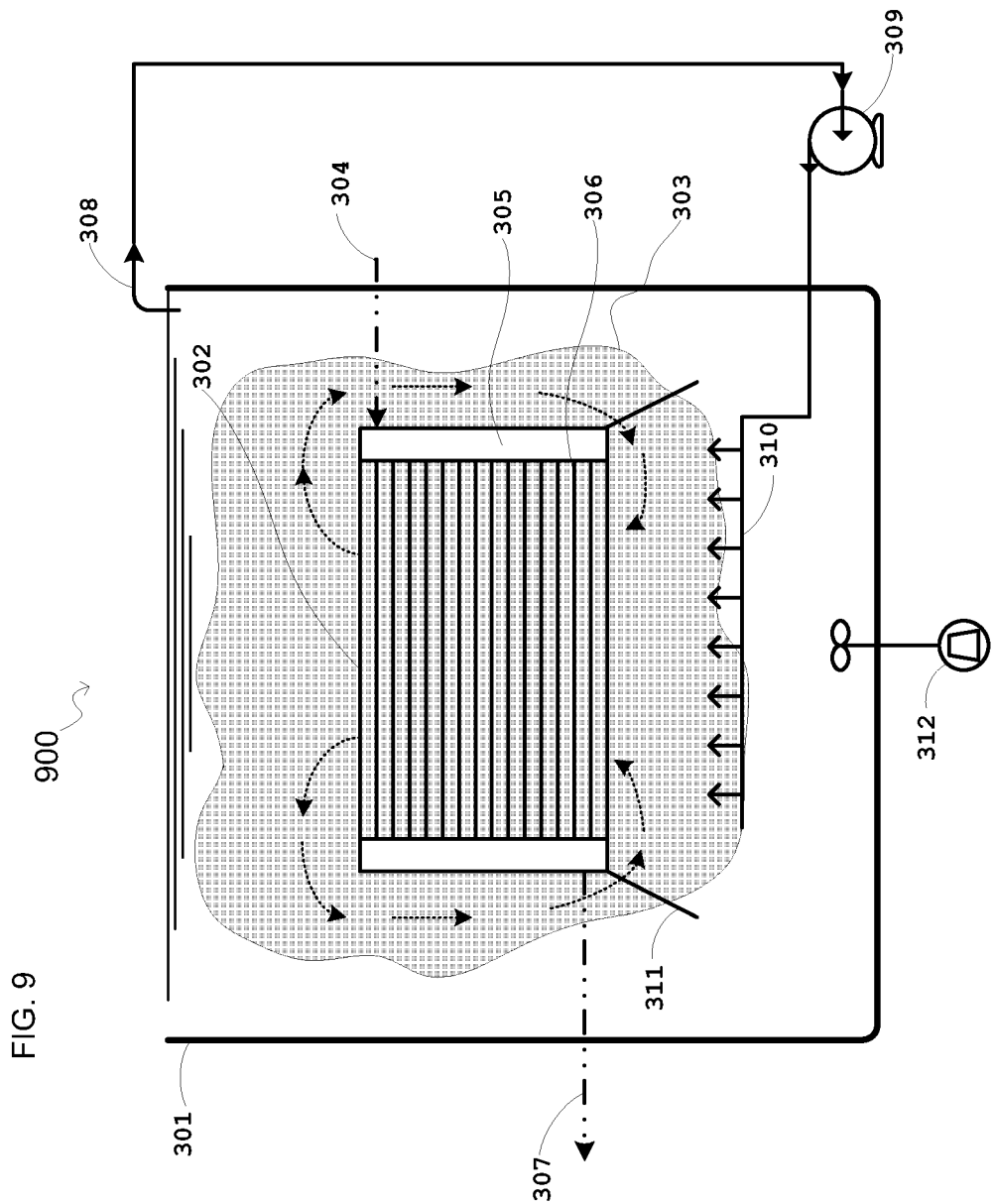
FIG. 9 depicts an indirect two-phase fluidized-bed heat exchanger.

FIG. 9 depicts indirect two-phase fluidized-bed heat exchanger 900. Wastewater containing process vessel 301 also contains heat exchanger 302. The vessel also contains media 303 that is fluidized by the motion of the fluid in the vessel and the passing over surfaces of heat exchanger 302. The fluidization media is selected so that it can easily pass through heat exchanger 302 and recirculate around the heat exchanger. Heated fluid 304 is supplied to the heat exchanger header 305 and into heat exchanger tubes 306. Heat is transferred to the wastewater and the spent heat supply fluid leaves the system in stream 307. The supply of the wastewater flows through stream 308 into fluidization pump 309. Pump 309 pressurizes the wastewater, and the pressurized wastewater is distributed through manifold 310. Baffles 311 direct the flow of fluid toward heat exchanger 302 and cause a circulatory motion that fluidizes the media. The fluidized media contact the heat exchanger tubes and scrub them. This contacting and scrubbing mechanism reduces or eliminates bio fouling of heat exchanger tubes 306. Optional mixer 312 may be added in any suitable location to impart velocity to the wastewater and media mixture and to enable the fluidized media to pass through the heat exchanger.

FIG. 9 shows a configuration in which the media travel generally upward through the heat exchanger. The system may also be arranged such that the media generally downward through the heat exchanger. The two-phase fluidized-bed heat exchanger shown in FIG. 9 may be applicable to heating the anoxic or anaerobic zones of any of the wastewater treatment systems shown in FIGS. 1-7.

Figure 10:
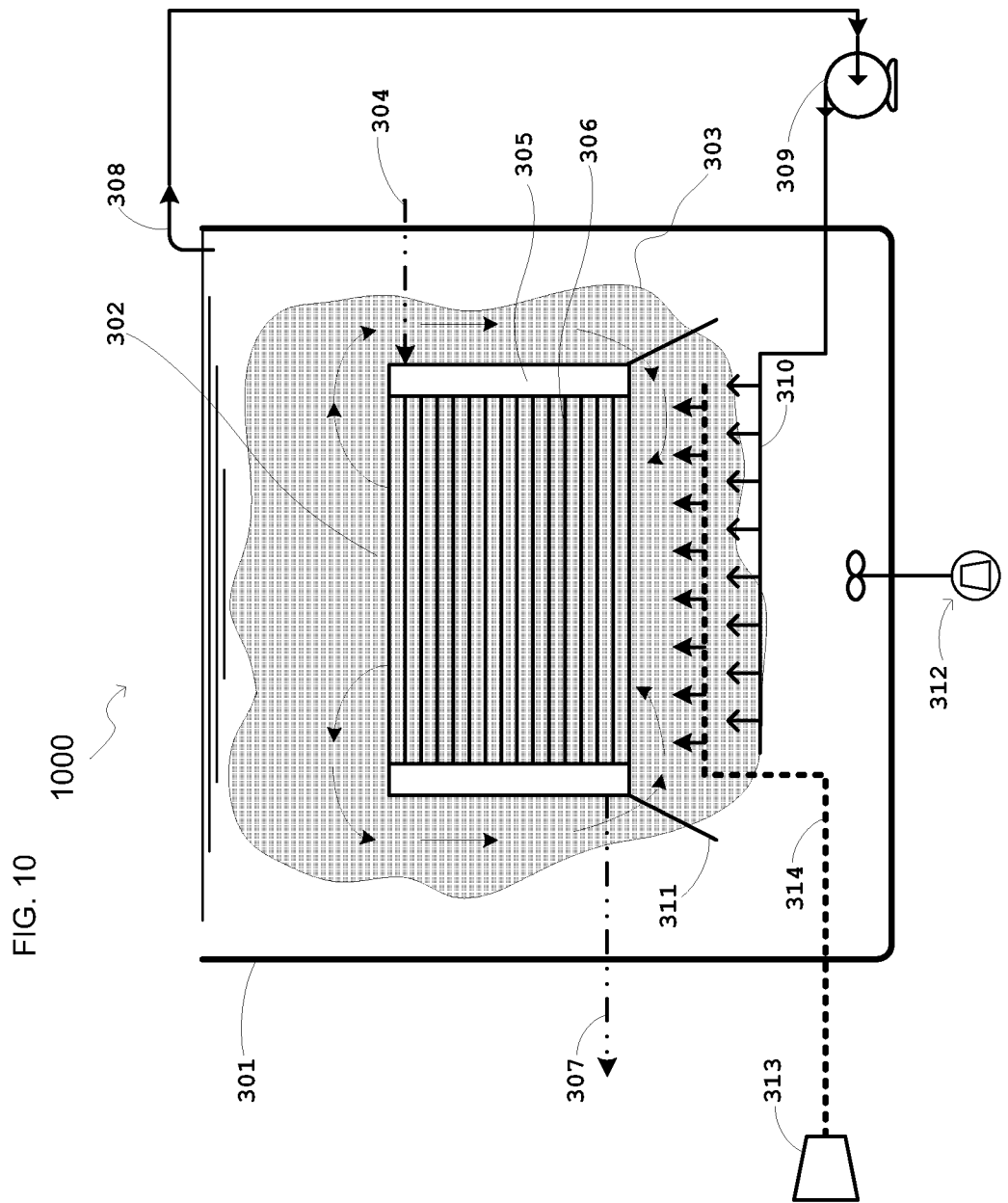
FIG. 10 depicts an indirect three-phase fluidized-bed heat exchanger.

FIG. 10 depicts indirect three-phase fluidized-bed heat exchanger 1000. Wastewater containing process vessel 301 also contains heat exchanger 302. The vessel also contains media 303 that is fluidized by the motion of the fluid in the vessel and the passing over surfaces of heat exchanger 1000. The fluidization media is selected so that it can pass through the heat exchanger and recirculate around heat exchanger 1000. Heated fluid 304 is supplied to heat exchanger header 305 and into heat exchanger tubes 306. Heat is transferred to the wastewater and the spent heat supply fluid leaves the system in stream 307. Optionally, a supply of the wastewater may flow through stream 308 in pump 309. Pump 309 pressurizes the wastewater and the pressurized wastewater is distributed through manifold 310. Optional mixer 312 may be added in any suitable location to impart velocity to the wastewater and media mixture and enable the fluidized media to pass through the heat exchanger. An element of three-phase fluidized-bed heat exchanger 100 is the air stream provided by compressor 313 via manifold 314. The air can reduce the bulk density of the media and wastewater in the heat exchanger and cause the media and wastewater to rise through the heat exchanger. Upon exiting the top of heat exchanger 1000, the air bubbles continue to the surface and the fluidization media recycles to the bottom of the vessel. Baffles 311 direct the flow of fluid toward heat exchanger 1000 and cause a circulatory motion that fluidizes the media. The fluidized media contact the heat exchanger tubes and scrub them. This contacting and scrubbing mechanism can reduce the effect of bio fouling on the heat exchanger tubes. FIG. 10 shows a configuration in which the media travel generally upward through heat exchanger 1000. This upward flow direction allows the media to be fluidized by the air bubbles rising through the heat exchanger. Three-phase fluidized-bed heat exchanger 1000 may be applicable to heating the aerobic zones of any of the wastewater treatment systems shown in FIGS. 1-7.

Start-up of the fluidized bed heat exchanger introduces liquid and optionally gas into the zone below the heat exchanger. At start up, this zone may be filled with the solid fluidizing media in an un-fluidized state. If the liquid and optional gas are introduced under sufficient pressure, this pressure may exert a force on the heat exchanger tubes by pushing on the un-fluidized mass of solids. If sufficiently high, this force may damage the heat exchanger tubes. A method and device to avoid this potential occurrence includes first slowly introducing gas and/or liquid into one or more elongated members (e.g., perforated tubes or porous cylinders) that are vertically suspended through one or more portions of the bed of solid particles. The flow of this gas and/or liquid can be steadily increased to fluidize a portion of the bed in the vicinity of the elongated members. Once fluidized zones are established in this manner, the main flow of gas and/or liquid may then be slowly increased, forming a fluidized zone(s), allowing flow through the heat exchanger with little or no pressure build-up on the heat exchanger tubes. As the full flow develops, a stable fluidized bed flow pattern is established.

Figure 11:
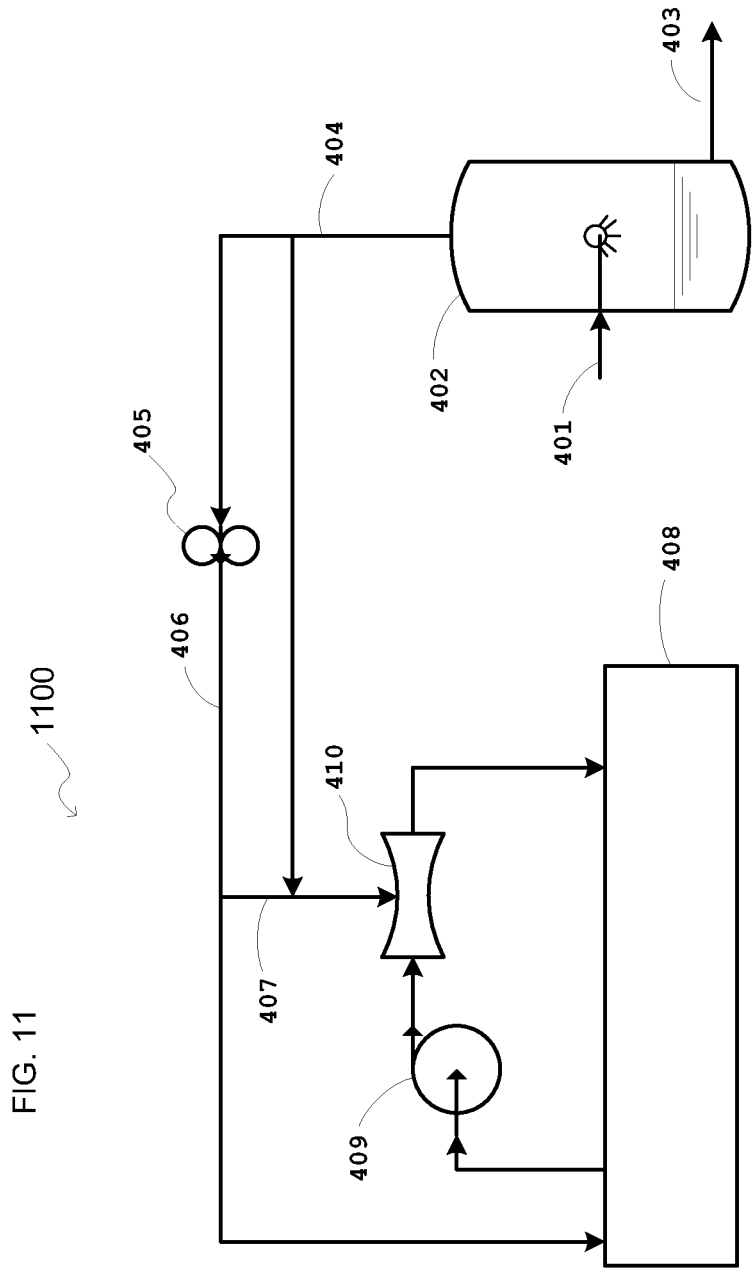
FIG. 11 depicts a direct contact heat exchanger options using a spray tower, blower or an eductor.

FIG. 11 depicts direct contact heat exchanger 1100 using a spray tower, blower and/or an eductor. Hot water supply 401 enters spray tower 402 where a portion of the hot water flashes into steam 404. This reduces the temperature of remaining water 403, which returns to the heat engine to be reheated. When the steam vapor has sufficiently high pressure to enable its use in an eductor or other mixing device, it flows via stream 404 to that use or device. When the steam vapor does not have sufficiently high enough pressure to enable its use in an eductor or other mixing device, it flows into compressor/blower 405 where it is compressed.

FIG. 11 shows venturi eductor 410 driven by circulated wastewater from wastewater vessel 408. The steam entering the low pressure zone of the venturi educator mixes and condenses with the wastewater flowing through the venturi eductor and thereby imparts heat directly to the wastewater stream. There are no heat exchange surfaces to foul and the velocity through the venturi eductor promotes clean surfaces. The direct contact heat exchanger approach shown in FIG. 11 may be applicable to heating any of the zones or areas of the wastewater treatment systems shown in FIGS. 1-7.

Figure 12:
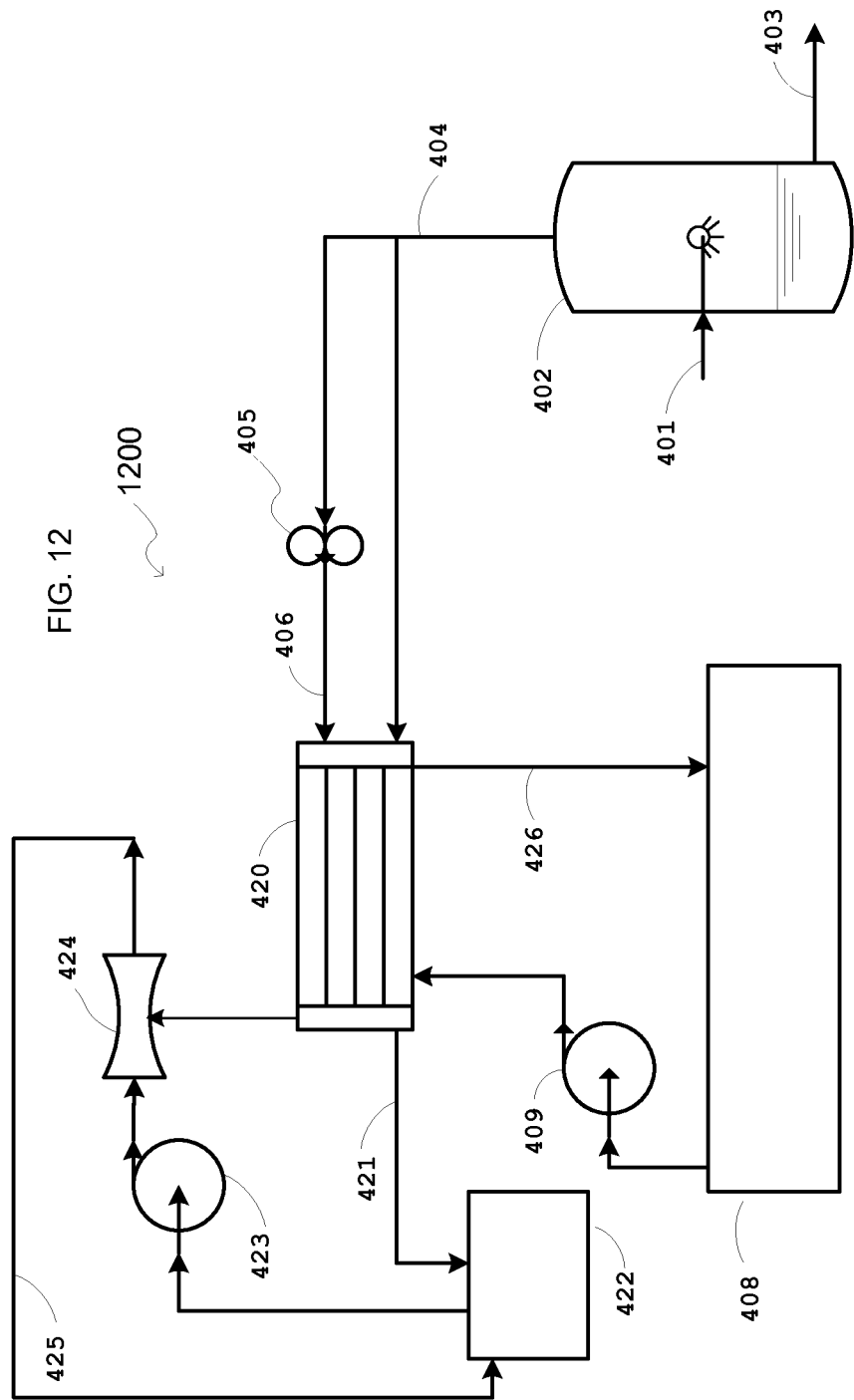
FIG. 12 depicts an indirect contact heat exchanger using a spray tower blower or an eductor.

FIG. 12 depicts indirect contact heat exchanger 1200 using a spray tower, blower and/or an eductor. Hot water supply 401 enters spray tower 402 where a portion of the hot water flashes into steam 404. This reduces the temperature of remaining water 403, which returns to the heat engine to be reheated. When the steam vapor has sufficiently high pressure to enable its use in a heat exchanger, it flows via stream 404 to heat exchanger 420. When the steam vapor does not have sufficiently high enough pressure to enable its use in an eductor or other mixing device, it flows into compressor/blower 405 where it is compressed prior to being sent to heat exchanger 420 via stream 406. The condensate from heat exchanger 420 flows via stream 421 into condensate zone 423. Wastewater to be heated flows into heat exchanger 420 from wastewater vessel 408 and, after heating, is returned to vessel 408 via stream 426. FIG. 12 shows an eductor 425 driven by circulated condensate driven by pump 424. Eductor 425 can remove non-condensable gases from the heat exchanger manifold to reduce back pressure so that the steam flows into the heat exchanger. The condensate and any non-condensable gases are returned to condensate zone 423 via stream 426. The indirect contact heat exchanger approach shown in FIG. 11 may be applicable to heating any of the zones or areas of the wastewater treatment systems shown in FIGS. 1-7. It may also be applicable to those areas that incorporate a fluidized bed heat exchanger, as shown in FIGS. 9 and 10.

Waste heat from a heat engine in excess of that used by the wastewater treatment system may be rejected via conventional means or used elsewhere. This allows the heat engine to operate flexibly while continuously providing the heat needed by the biological processes in the wastewater treatment system. In this way, the power system can flexibly provide peaking power for both diurnal periods of high electricity demand and high wastewater flows, whether these demands or flows are synchronous or non-synchronous.

In an example, during low flow conditions in the summer when the influent wastewater is relatively warm, the heat load to the biological process is low. However, electrical demand is often high in the summer due to air conditioning requirements. In this case, the heat engine may be run at full power and direct a relatively small portion of the waste heat to the biological process, using conventional heat rejection means for the balance of the rejected heat. In winter when the flow of wastewater is high, the influent wastewater is relatively cold, and the demand for electricity was low, the heat engine may be run at high enough power to produce enough heat to warm the wastewater to the design operating temperature.

A number of embodiments of the invention have been described. Nevertheless, it will be understood that various modifications may be made without departing from the spirit and scope of the invention. For example, some implementations may include one or more agitators to aid in the release of the analyte from the liquid sample. Further, multiple pumps and/or valves may be included in one or more vacuum paths to evacuate the container and/or to eliminate redundant system components or to facilitate the re-pressurization of the container. Accordingly, other embodiments are within the scope of the following claims.

What is claimed is:

1. An apparatus comprising:
 a fluidized bed heat exchanger comprising:
  heat exchange surfaces;
  porous particulates in contact with the heat exchange surfaces; and
  bacteria coupled to an interior of the porous particulates.

2. The apparatus of claim 1, further comprising a means for providing a flow pattern for the porous particulates to contact the heat exchange surfaces.

3. The apparatus of claim 1, further comprising one or more elongated members arranged among the porous particulates and configured to allow introduction of air among the porous particulates.

4. The apparatus of claim 3, wherein at least one of the one or more elongated members is a porous cylinder or a perforated tube.

5. The apparatus of claim 1, wherein the heat exchanger is a two-phase fluidized bed heat exchanger or a three phase fluidized bed heat exchanger.

6. The apparatus of claim 1, wherein contact of the porous particulates with the heat exchange surfaces scrubs the heat exchange surfaces, thereby reducing bio fouling of the heat exchange surfaces.

7. The apparatus of claim 1, further comprising a process vessel containing wastewater, wherein the fluidized bed heat exchanger is positioned in the process vessel and the wastewater is in contact with the fluidized bed heat exchanger.

8. The apparatus of claim 7, wherein the fluidized bed heat exchanger is configured to provide heat to the wastewater via the heat exchange surfaces.

9. The apparatus of claim 7, further comprising a pump coupled to the process vessel, wherein the pump is configured to create a flow of the wastewater in the process vessel proximate the fluidized bed heat exchanger, thereby facilitating fluidization of the porous particulates in the fluidized bed heat exchanger.

10. The apparatus of claim 9, further comprising a manifold coupled to the pump, wherein the pump is configured to provide pressurized wastewater to the manifold.

11. The apparatus of claim 10, further comprising baffles coupled to the manifold, wherein the baffles are configured to direct a flow of the wastewater toward the fluidized bed heat exchanger.

12. The apparatus of claim 7, further comprising a mixer coupled to the process vessel, wherein the mixer is configured to facilitate movement of the porous particulates with respect to the heat exchange surfaces.

13. The apparatus of claim 7, wherein the fluidized bed heat exchanger is a two-phase fluidized bed heat exchanger, and the process vessel is positioned in an anoxic or anaerobic zone in a wastewater treatment system.

14. The apparatus of claim 7, wherein the fluidized bed heat exchanger is a three-phase fluidized bed heat exchanger, and the process vessel is positioned in an aerobic zone of a wastewater treatment system.

15. The apparatus of claim 14, further comprising a compressor coupled to the process vessel and configured to provide air to the wastewater in the process vessel.

16. The apparatus of claim 15, further comprising a manifold coupled to the compressor, wherein the compressor is configured to provide pressurized air to the manifold.

17. The apparatus of claim 16, further comprising baffles coupled to the manifold, wherein the baffles are configured to direct a flow of air toward the fluidized bed heat exchanger.

18. The apparatus of claim 17, wherein the porous particulates are fluidized by the flow of air from the baffles.

19. A method of treating wastewater, the method comprising:
   contacting a fluidized bed heat exchanger with wastewater, the fluidized bed heat exchanger comprising:
      heat exchange surfaces; and
      porous particulates in contact with the heat exchange surfaces;
   transferring heat from the fluidized bed heat exchanger to the wastewater;
   directing a flow of the wastewater toward the fluidized bed exchanger, thereby fluidizing the porous particulates; and
   scrubbing the heat exchange surfaces with the porous particulates, thereby reducing bio fouling of the heat exchange surfaces.

20. A method of treating wastewater, the method comprising:
   contacting a fluidized bed heat exchanger with wastewater, the fluidized bed heat exchanger comprising:
      heat exchange surfaces; and
      porous particulates in contact with the heat exchange surfaces;
   transferring heat from the fluidized bed heat exchanger to the wastewater;
   directing a flow of air toward the fluidized bed exchanger, thereby fluidizing the porous particulates; and
   scrubbing the heat exchange surfaces with the porous particulates, thereby reducing bio fouling of the heat exchange surfaces.

* * * * *